United States Patent [19]
Allabashi

[11] 3,897,514
[45] July 29, 1975

[54] CURING HYDROXY-TERMINATED PREPOLYMER USING ANHYDRIDE/EPOXIDE CURING SYSTEM

[75] Inventor: John C. Allabashi, Cumberland, Md.

[73] Assignee: Hercules Incorporated, Wilmington, Del.

[22] Filed: July 9, 1973

[21] Appl. No.: 377,859

[52] U.S. Cl. ........ 260/836; 260/2 EC; 260/78.4 EP; 260/837 R
[51] Int. Cl............................................ C08g 30/12
[58] Field of Search...... 260/78.4 D, 78.4 EP, 2 EC, 260/836, 830 R, 837 R

[56] References Cited
UNITED STATES PATENTS

| | | | |
|---|---|---|---|
| 3,324,198 | 6/1967 | Gruver | 260/836 |
| 3,397,254 | 8/1968 | Wynstra et al. | 260/835 |
| 3,510,459 | 5/1970 | Mersereau | 260/78.4 |
| 3,689,444 | 9/1972 | Wolfe | 260/18 EP |
| 3,739,041 | 6/1973 | Schmid et al. | 260/835 |
| 3,772,402 | 11/1973 | Buck et al. | 260/830 R |

*Primary Examiner*—Joseph L. Schofer
*Assistant Examiner*—John Kight
*Attorney, Agent, or Firm*—Edith A. Rice; Michael B. Keehan

[57] ABSTRACT

Hydroxy-terminated prepolymer is cured by reaction with a cyclic anhydride and an epoxide in the presence of a curing catalyst selected from chromium salts of aliphatic carboxylic acids containing 2-22 carbon atoms, chromium naphthenate and vanadium naphthenate. The anhydride/epoxide combination must be mutually soluble in the hydroxy-terminated prepolymer to produce a homogeneous cured rubber product.

10 Claims, No Drawings

CURING HYDROXY-TERMINATED PREPOLYMER USING ANHYDRIDE/EPOXIDE CURING SYSTEM

This invention relates to a process for curing hydroxy-terminated prepolymer to rubber and to the resulting cured rubber product.

Di- and poly-isocyanates are well known curing agents for hydroxy-terminated prepolymers. At temperatures frequently used for processing hydroxy-terminated prepolymers and isocyanate curing agent, isocyanates are highly reactive with water. During such processing, special steps must therefore be taken to provide minimum exposure to moisture.

It is an object of this invention to provide a process for curing hydroxy-terminated prepolymer which avoids the problems associated with the isocyanate cure of said prepolymer.

In accordance with this invention, a hydroxy-terminated prepolymer is cured by a process which comprises admixing (a) a hydroxy-terminated prepolymer with a curing system comprising a cyclic anhydride and a di- or tri-functional epoxide and a curing catalyst selected from chromium salts of aliphatic carboxylic acids containing 2 to 22 carbon atoms, chromium naphthenate and vanadium naphthenate and (b) heating the resulting admixture at a temperature of at least about 30°C. until a cured solid rubber product is obtained. The hydroxy-terminated prepolymer cured by the process of this invention has a molecular weight of from about 2,000 to about 4,000 and a hydroxyl functionality of between about 2.2 and about 2.6. The cyclic anhydride and epoxide employed in the curing system must be mutually soluble in the uncured hydroxy-terminated prepolymer to produce a homogeneous cured rubber product.

Although it is to be understood that this invention is not limited to a particular theory, it is believed that the reaction of the hydroxy-terminated prepolymer with the curing system comprising a cyclic anhydride and an epoxide occurs in two steps. In the first step, the hydroxyl groups of the hydroxy-terminated prepolymer react with cyclic anhydride to form ester linkages and terminal carboxylic acid groups. This reaction proceeds rapidly at first and then reaches a transition period at which the rate falls off abruptly to a lower rate which remains constant until the reaction is complete. No catalyst is required for this step. The second step is a cross-linking reaction between the terminal carboxylic acid groups, formed in the first step, and the di- or tri-functional epoxide. The reaction of the second step is promoted by the curing catalyst. Thus, it is believed that the curing of the hydroxy-terminated prepolymer results from the in-situ transformation of the hydroxyl groups to acid functionality followed by the reaction of the di- or tri-functional epoxide with the terminal carboxylic acid groups to form a cross-linked polymer network.

The following examples illustrate the process and product of this invention. In these examples all parts and percentages are in parts by weight unless otherwise specified.

EXAMPLE 1

This example illustrates curing of hydroxy-terminated polybutadiene prepolymer with a curing system comprising hexahydrophthalic anhydride and a cycloaliphatic epoxide.

To a glass container are added 13.432 parts of hydroxyterminated polybutadiene having an equivalent molecular weight (based on hydroxyl content) of 1,000–1,400, a viscosity of about 10 poise at 60°C. and a functionality of 2.4; 1.620 parts of hexahydrophthalic anhydride; 1.474 parts of a 3′,4′-epoxycyclohexyl methyl-3,4-epoxycyclohexane carboxylate; 0.100 part of chromium octoaote, as a solution in tetrahydrofuran; and 3.374 parts of dioctyladipate as placticizer. The mixture is stirred and the container is placed in a vacuum desiccator maintained at 60°C. for about 15 minutes to completely deaerate the mixture. The resulting deaerated mixture is placed in a polytetrafluoroethylene tube having an internal diameter of one-fourth inch, and cured at 60°C. for the number of days shown in Table I. The mechanical properties of the cured rubber are shown in Table I.

EXAMPLE 2

This example illustrates curing of hydroxy-terminated polybutadiene prepolymer with a curing system comprising dodecenyl succinic anhydride and diglycidyl ether of bisphenol A.

The processing procedure according to Example 1 is repeated using the following reactants: 12.466 parts of hydroxyterminated polybutadiene, 2.620 parts dodecenyl succinic anhydride, 1.702 parts of the diglycidyl ether of bisphenol A, 0.100 part of chromium octoate and 3.112 parts of dioctyladipate plasticizer. The mechanical properties of the resulting cured rubber are shown in Table I.

Table I

Mechanical Properties of Cured Hydroxy-terminated Polybutadiene

| Curing System | Plasticizer (%) | Sealant Modulus (psi) | Elongation (%) | Cure Time (Days at 60°C.) |
|---|---|---|---|---|
| Ex. 1 | 16.8 | 5.6 | 650 | 10 |
|  |  | 7.5 | 709 | 17 |
|  |  | 8.6 | 675 | 30 |
| Ex. 2 | 15.6 | 1.4 | 435 | 9 |
|  |  | 3.3 | 425 | 12 |
|  |  | 3.4 | 450 | 20 |

The hydroxy-terminated prepolymer which is cured in accordance with this invention contains on the average about 2.4 free hydroxyl groups per prepolymer molecule and is preferably a homopolymer of an olefin such as isobutylene or a conjugated diene containing 4–8 carbon atoms, such as butadiene-1,3,isoprene, octadiene-1,3, and the like; a copolymer of more than one olefin or conjugated diene, such as an ethylene-propylene copolymer; a copolymer of a conjugated diene with other copolymerizable monomers which are preferably vinyl-substituted aromatic compounds such as styrene and the 1- or 2-vinyl naphthalenes and their alkyl, aryl, methoxy, cycloalkyl, alkaryl, aralkyl, aryloxy and dialkylamino derivatives, or a mixture of any of the above homo- and co-polymers.

The hydroxy-terminated prepolymer can be produced in known manner, for example, by the anionic polymerization of the desired monomer using a metal alkyl to form the prepolymer and then attaching the terminal hydroxyl groups by reaction with an epoxide.

Hydroxy-terminated polybutadiene having a molecular weight of from about 2,500 to about 3,000 and a hydroxyl functionality from about 2.3 to about 2.5, is a particularly preferred hydroxy-terminated prepolymer for the process of this invention.

The curing system used to cure the hydroxy-terminated prepolymer in accordance with this invention comprises a cyclic anhydride and a di- or tri-functional epoxide. The particular cyclic anhydride and epoxide used in combination must be mutually soluble in the uncured hydroxy-terminated prepolymer in the proportions used to provide a homogeneous cured rubber product. The equivalence ratio of hydroxy-terminated prepolymer to anhydride to epoxide is in the range of 1.0 to 0.8–1.2 to 0.8–1.2, respectively, and is preferably 1 to 1 to 1 respectively.

Anhydrides that can be employed in the curing system are cyclic anhydrides of di- and poly-carboxylic acids, which are soluble in the uncured hydroxy-terminated prepolymer in the presence of the epoxide selected for the curing system. Illustrative anhydrides are hexahydrophthalic anhydride, endomethylenetetrahydrophthalic anhydride, maleic anhydride, succinic anhydride, dodecenyl succinic anhydride, and methyl bicyclo[2·2·1]heptene-2,3-dicarboxylic anhydride.

Epoxides that can be employed in the curing system are di- and tri-functional epoxides which are soluble in the hydroxy-terminated prepolymer in the presence of the particular anhydride selected for the curing system. Typical epoxides that can be used are diglycidyl ether type epoxides, cyclic aliphatic diepoxides and triepoxides. Specific examples of such epoxides are the epoxycyclohexylalkyl epoxycyclohexane carboxylates, for example, 3',4'-epoxycyclohexylmethyl 3,4-epoxycyclohexane; 3',4'-epoxy-1'-methylcyclohexylmethyl 3,4-epoxy-1-methylcyclohexanecarboxylate; 3',4'-epoxy-2'-methylcyclohexylmethyl 3,4-epoxy-2-methylcyclohexanecarboxylate; 3',4'-epoxy-6'-methylcyclohexylmethyl-3,4-epoxy-6-methylcyclohexanecarboxylate; (1'-chloro-3',4'-epoxycyclohexan-1-yl)methyl-1-chloro-3,4-epoxycyclohexanecarboxylate; (1'-bromo-3',4'-epoxycyclohexan-1'-yl)methyl-1-bromobromo-3,4-epoxycyclohexanecarboxylate; and (1'-chloro-2'-methyl-4',5'-epoxycyclohexan-1-yl)methyl-1-chloro-2-methyl-4,5-epoxycyclohexanecarboxylate; and diglycidyl ether type epoxides, such as, 2,2-bis[p-(2,3-epoxypropoxy)phenyl]propane (i.e., the reaction product of diglycidyl ether and bisphenol A), and 2,2-bis(2,3-epoxypropoxyphenyl)methane. Triepoxides that can be employed are the triepoxides of aminophenols, for example, triglycidyl p-aminophenol.

The catalyst used to effect cure of the hydroxy-terminated prepolymer by reaction with the cyclic anhydride and epoxide are chromium salts of aliphatic carboxylic acids containing 2 to 22 carbon atoms and preferably 2 to 18 carbon atoms, chromium naphthenate or vanadium naphthenate. The preferred catalysts include chromium acetate, chromium 2-ethylhexanoate, chromium neodecanoate, chromium octoate, chromium stearate, chromium oleate, chromium naphthenate and vanadium napthenate. The amount of catalyst necessary to promote the reaction varies with the particular salt employed and the cure rate desired. In general, the amount utilized will vary from a very small catalytic amount up to about 5% of the composition and preferably will be from about 0.2% to about 0.7% by weight of the composition.

The cure reaction between the hydroxy-terminated prepolymer and the cyclic anhydride and epoxide is conducted at temperatures of from about 30° to about 80°C., and preferably at about 50° to about 60°C. Reaction is continued until a solid cured rubber product is obtained. The time required for completion of the cure will vary with the curing temperature. At the preferred curing temperature range of about 50° to about 60°C., the desired degree of cure will be attained in from 5 days to about 14 days.

Hydroxy-terminated prepolymer when cured in accordance with this invention, can be used as a binder in solid composite propellants. To prepare such a composite propellant, a binder premix of hydroxy-terminated prepolymer, di- or tri-epoxide and curing catalyst is formed. Then conventional propellant solids, such as a mixture of particulate ammonium perchlorate, powdered aluminum and iron oxide, are added. A surfactant, such as lecithin, polyglycol esters of fatty acids and mixtures of sorbitan monooleate and polyoxyethylene esters of mixed fatty and resin acids, is added to improve wetting of the propellant solids by the binder premix. The anhydride component of the curing system is then added and the resulting admixture is cured.

What I claim and desire to protect by Letters Patent is:

1. A process for curing hydroxy-terminated prepolymer comprising (a) admixing a hydroxy-terminated prepolymer having an equivalent molecular weight of from about 2,000 to about 4,000, based on hydroxyl content, and a hydroxyl functionality of from about 2.2 to about 2.6; a curing system comprising a cyclic anhydride and an epoxide, said cyclic anhydride and epoxide being mutually soluble in said hydroxy-terminated prepolymer and the equivalence ratio of said hydroxy-terminated prepolymer to cyclic anhydride to epoxide being from about 1.0 to about 0.8–1.2 to about 0.8–1.2 respectively; and a curing catalyst selected from chromium salts of aliphatic carboxylic acids containing 2–22 carbon atoms, chromium naphthenate and vanadium naphthenate; and (b) heating the resulting admixture at a temperature of at least about 30°C. until a solid cured rubber product is obtained.

2. The process of claim 1 wherein the anhydride is selected from the group consisting of dodecenylsuccinic anhydride and hexahydrophthalic anhydride and the epoxide is selected from the group consisting of the diglycidyl ether of bisphenol A and 3',4'-epoxycyclohexylmethyl-3,4-epoxycyclohexane carboxylate.

3. The process of claim 2 wherein the anhydride is dodecenylsuccinic anhydride and the epoxide is the diglycidyl ether of bisphenol A.

4. The process of claim 2 wherein the anhydride is hexahydrophthalic anhydride and the epoxide is 3',4'-epoxycyclohexylmethyl-3,4-epoxy cyclohexane carboxylate.

5. The process of claim 1 wherein the equivalence ratio of said hydroxy-terminated prepolymer to cyclic anhydride to epoxide is 1:1:1.

6. The process of claim 1 wherein the hydroxy-terminated prepolymer is hydroxy-terminated polybutadiene having a molecular weight from about 2,500 to about 3,200 and a hydroxyl functionality from about 2.3 to about 2.5.

7. The process of claim 6 wherein the equivalence ratio of said hydroxy-terminated polybutadiene to cyclic anhydride to epoxide is 1:1:1.

8. The process of claim 6 wherein the anhydride is selected from the group consisting of dodecenylsuccinic anhydride and hexahydrophthalic anhydride and the epoxide is selected from the group consisting of the diglycidyl ether of bisphenol A and 3',4'-epoxycyclohexylmethyl-3,4-epoxycyclohexane carboxylate.

9. The process of claim 8 wherein the anhydride is dodecenylsuccinic anhydride and the epoxide is the diglycidyl ether of bisphenol A.

10. The process of claim 8 wherein the anhydride is hexahydrophthalic anhydride and the epoxide is 3',4'-epoxycyclohexylmethyl-3,4-epoxycyclohexane carboxylate.

* * * * *